(12) United States Patent
Macciola et al.

(10) Patent No.: US 10,049,268 B2
(45) Date of Patent: Aug. 14, 2018

(54) SELECTIVE, USER-MEDIATED CONTENT RECOGNITION USING MOBILE DEVICES

(71) Applicant: Kofax, Inc., Irvine, CA (US)

(72) Inventors: Anthony Macciola, Irvine, CA (US); Alexander Shustorovich, Pittsford, NY (US); Christopher W. Thrasher, Rochester, NY (US); Jan W. Amtrup, Silver Spring, MD (US)

(73) Assignee: KOFAX, INC., Irvine, CA (US)

( * ) Notice: Subject to any disclaimer, the term of this patent is extended or adjusted under 35 U.S.C. 154(b) by 202 days.

(21) Appl. No.: 15/059,242

(22) Filed: Mar. 2, 2016

(65) Prior Publication Data

US 2016/0259974 A1     Sep. 8, 2016

Related U.S. Application Data

(60) Provisional application No. 62/129,678, filed on Mar. 6, 2015.

(51) Int. Cl.
*G06K 9/34* (2006.01)
*G06K 9/00* (2006.01)
*G06K 9/22* (2006.01)
*G06K 9/20* (2006.01)
*G06K 9/32* (2006.01)

(52) U.S. Cl.
CPC ....... *G06K 9/00463* (2013.01); *G06K 9/2081* (2013.01); *G06K 9/22* (2013.01); *G06K 9/325* (2013.01); *G06K 9/3208* (2013.01); *G06K 2209/01* (2013.01)

(58) Field of Classification Search
CPC .. G06K 9/00463; G06K 9/325; G06K 9/3208; G06K 9/2081; G06K 9/22; G06K 2209/01
USPC .................................................. 382/173–180
See application file for complete search history.

(56) References Cited

U.S. PATENT DOCUMENTS

| | | | | |
|---|---|---|---|---|
| 6,081,616 A | * | 6/2000 | Vaezi | G06K 9/00456 382/171 |
| 2005/0201624 A1 | * | 9/2005 | Hara | H04N 19/647 382/232 |
| 2011/0280481 A1 | * | 11/2011 | Radakovic | G06K 9/033 382/177 |
| 2012/0120444 A1 | * | 5/2012 | Hirohata | G06K 9/00449 358/1.15 |

(Continued)

*Primary Examiner* — Andrew Moyer
(74) *Attorney, Agent, or Firm* — Zilka-Kotab, P.C.

(57) ABSTRACT

A method includes: displaying a digital image on a first portion of a display of a mobile device; receiving user feedback via the display of the mobile device; analyzing the user feedback to determine a meaning of the user feedback; based on the determined meaning of the user feedback, analyzing a portion of the digital image corresponding to either the point of interest or the region of interest to detect one or more connected components depicted within the portion of the digital image; classifying each detected connected component depicted within the portion of the digital image; estimating an identity of each detected connected component based on the classification of the detected connected component; and one or more of: displaying the identity of each detected connected component on a second portion of the display of the mobile device; and providing the identity of each detected connected component to a workflow.

15 Claims, 5 Drawing Sheets

(56) References Cited

U.S. PATENT DOCUMENTS

| | | | |
|---|---|---|---|
| 2012/0131520 A1* | 5/2012 | Tang | G06F 3/04842 |
| | | | 715/863 |
| 2014/0023270 A1* | 1/2014 | Baheti | G06K 9/4661 |
| | | | 382/171 |
| 2014/0068509 A1* | 3/2014 | Kadishay | G06F 3/04883 |
| | | | 715/810 |

* cited by examiner

SELECTIVE, USER-MEDIATED CONTENT RECOGNITION USING MOBILE DEVICES

RELATED APPLICATIONS

The present application claims the benefit of priority to U.S. Provisional Patent Application No. 62/129,678, filed Mar. 6, 2015 and entitled "Selective, User-Mediated Content Recognition Using Mobile Devices," the contents of which are herein incorporated by reference.

FIELD OF INVENTION

The present invention relates to capturing and processing digital images using a mobile device, and even more particularly to performing content recognition with minimum latency using only processing resources on-board the mobile device.

BACKGROUND OF THE INVENTION

Digital images having depicted therein a document such as a letter, a check, a bill, an invoice, etc. have conventionally been captured and processed using a scanner or multi-function peripheral coupled to a computer workstation such as a laptop or desktop computer. Methods and systems capable of performing such capture and processing are well known in the art and well adapted to the tasks for which they are employed.

However, in an era where day-to-day activities, computing, and business are increasingly performed using mobile devices, it would be greatly beneficial to provide analogous document capture and processing systems and methods for deployment and use on mobile platforms, such as smart phones, digital cameras, tablet computers, etc.

A major challenge in transitioning conventional document capture and processing techniques is the limited processing power and image resolution achievable using hardware currently available in mobile devices. These limitations present a significant challenge because it is impossible or impractical to process images captured at resolutions typically much lower than achievable by a conventional scanner. Further, since the capture environment is not "controlled" as in a conventional scanner, images captured using mobile devices tend to include problematic artifacts such as blur, uneven illumination, shadows, distortions, etc. As a result, conventional scanner-based processing algorithms typically perform poorly on digital images captured using a mobile device.

In addition, the limited battery life, processing and memory available on mobile devices makes conventional image processing algorithms employed for scanners prohibitively expensive in terms of computational cost and power consumption. Attempting to process a conventional scanner-based image processing algorithm takes far too much time to be a practical application on modern mobile platforms. As a result, attempts to implement conventional image processing techniques on mobile devices have not met with success, because the mobile devices are incapable of processing the data with sufficiently low latency/processing time to benefit the underlying application of the processing algorithm, and/or the processing consumes prohibitive amounts of battery power to b useful.

For example, network-mediated processing tasks may experience a timeout because the processing time is longer than a maximum window of time permitted for performing a particular operation or network transaction. This is a common limitation to implementing traditional image processing algorithms on mobile platforms, especially in useful financial transaction workflows such as mobile deposit, mobile bill pay, mobile invoicing, mobile loan applications, etc. as well as business process management workflows such as customer onboarding, claims processing, expense report submission, etc.

With specific respect to document processing, it is well known as advantageous in the art of digital document image processing to extract information from the imaged document, e.g. extracting alphanumeric information utilizing an optical character recognition (OCR) technique. Conventionally, the document image may be pre-processed, for instance to improve image quality, reduce color depth (e.g. from color to grayscale or binary), crop the image (e.g. to remove background textures), resize and/or reorient the document as depicted in the captured image, detect the presence of artifacts such as shadows, tears, foreign objects, etc., and/or measure and ensure sufficient illumination to perform downstream processing.

In some approaches, the image may be subjected to a resolution reduction (also known as "downsampling") to reduce the amount of data the OCR engine must process to generate a character prediction. However, downsampling can be problematic because the OCR engine still must be provided sufficient data to reliably generate accurate character predictions, so there is an inherent limit to the amount of processing advantage that can be obtained from downsampling. Further, downsampling is known to reduce the accuracy of the OCR engine's predictions, so it is not a preferred solution to the problem of exceptionally high computational cost imposed by OCR on mobile platforms.

In other approaches, since mobile devices are advantageously capable of connecting to a network and harnessing other processing resources available to the network (e.g. cloud computing), many existing content recognition technologies will utilize the mobile device to capture the image of the critical document, and transmit this image (perhaps with preprocessing performed on the mobile device prior to transmission) to a network resource having much more available processing power, memory, etc. The processed image (said processing being accomplished, often, in a time order(s) of magnitude less than if the identical processing operation had been performed using the mobile device alone) is then transmitted back to the mobile device for subsequent processing and or use. However, this does require the use of a data plan, and can quickly consume periodic data allocations, causing increased cost to perform the overall processing. In addition, not all mobile devices are necessarily connected to network resources, or capable of connecting to network resources, at all times. Accordingly, approaches that rely on the use of external processing resources are limited by virtue of the very reliance on an active network connection, restricting the temporal and geographic extent of these techniques' utility.

A still further challenge is presented by the nature of mobile capture components (e.g. cameras on mobile phones, tablets, etc.). Where conventional scanners are capable of faithfully representing the physical document in a digital image, critically maintaining aspect ratio, dimensions, and shape of the physical document in the digital image, mobile capture components are frequently incapable of producing such results.

Specifically, images of documents captured by a camera present a new line of processing issues not encountered when dealing with images captured by a scanner. This is in part due to the inherent differences in the way the document image is acquired, as well as the way the devices are constructed. The way that some scanners work is to use a transport mechanism that creates a relative movement between paper and a linear array of sensors. These sensors create pixel values of the document as it moves by, and the sequence of these captured pixel values forms an image. Accordingly, there is generally a horizontal or vertical consistency up to the noise in the sensor itself, and it is the same sensor that provides all the pixels in the line.

In contrast, cameras have many more sensors in a nonlinear array, e.g., typically arranged in a rectangle. Thus, all of these individual sensors are independent, and render image data that is not typically of horizontal or vertical consistency. In addition, cameras introduce a projective effect that is a function of the angle at which the picture is taken. For example, with a linear array like in a scanner, even if the transport of the paper is not perfectly orthogonal to the alignment of sensors and some skew is introduced, there is no projective effect like in a camera. Additionally, with camera capture, nonlinear distortions may be introduced because of the camera optics.

In the context of document image capture and content extraction using, e.g. OCR techniques, this distortion can be particularly problematic because in the image, straight lines of character strings may appear to be not only linearly slanted according to a skew angle, but may be characterized by more complex polynomial functions of second degree or higher order, producing a curve with a decreasing/increasing slope, a curve with changes in slope that reverse direction over the length of the curve, etc. Even many of the preprocessing techniques alluded-to above cannot adequately resolve these distortive effects to allow precise and accurate character prediction via OCR.

In view of the challenges presented above, it would be beneficial to provide an image capture and processing algorithm and applications thereof that compensate for and/or correct problems associated with image capture and processing, particularly content recognition, using a mobile device. It is critical that the solution address these problems while maintaining a low computational cost, even when processing resources are restricted to those hardware and software components physically located on the mobile device, so as to remove the temporal and geographic restrictions inherent to techniques that leverage external (e.g. network-connected) processing resources beyond those physically present on the mobile device itself

SUMMARY OF THE INVENTION

In one embodiment, a method is directed to processing a digital image comprising a digital representation of a document. The method includes: displaying the digital image on a first portion of a display of a mobile device; receiving user feedback via the display of the mobile device, the user feedback designating either a point of interest or a region interest within the displayed image, wherein each of the point of interest and the region of interest respectively comprise only a portion of the digital image; analyzing the user feedback to determine a meaning of the user feedback; based on the determined meaning of the user feedback, analyzing a portion of the digital image corresponding to either the point of interest or the region of interest to detect one or more connected components depicted within the portion of the digital image; classifying each detected connected component depicted within the portion of the digital image; estimating an identity of each detected connected component based on the classification of the detected connected component; and one or more of: displaying the estimated identity of each detected connected component on a second portion of the display of the mobile device; providing the estimated identity of each detected connected component to a workflow.

In another embodiment, a system includes a mobile device comprising hardware and logic. The logic is configured to use the hardware of the mobile device to display the digital image on a first portion of a display of a mobile device; receive user feedback via the display of the mobile device, the user feedback designate either a point of interest or a region interest within the displayed image, wherein each of the point of interest and the region of interest respectively comprise only a portion of the digital image; analyze the user feedback to determine a meaning of the user feedback; based on the determined meaning of the user feedback, analyze a portion of the digital image corresponding to either the point of interest or the region of interest to detect one or more connected components depicted within the portion of the digital image; classify each detected connected component depicted within the portion of the digital image; estimate an identity of each detected connected component based on the classification of the detected connected component; and one or more of: display the estimated identity of each detected connected component on a second portion of the display of the mobile device; provide the estimated identity of each detected connected component to a workflow.

In yet another embodiment, a computer program product includes a computer readable storage medium having stored thereon computer readable program code. The computer readable program code is configured to use hardware of a mobile device to: display the digital image on a first portion of a display of a mobile device; receive user feedback via the display of the mobile device, the user feedback designate either a point of interest or a region interest within the displayed image, wherein each of the point of interest and the region of interest respectively comprise only a portion of the digital image; analyze the user feedback to determine a meaning of the user feedback; based on the determined meaning of the user feedback, analyze a portion of the digital image corresponding to either the point of interest or the region of interest to detect one or more connected components depicted within the portion of the digital image; classify each detected connected component depicted within the portion of the digital image; estimate an identity of each detected connected component based on the classification of the detected connected component; and one or more of: display the estimated identity of each detected connected component on a second portion of the display of the mobile device; provide the estimated identity of each detected connected component to a workflow.

Of course, the foregoing embodiments are to be understood as merely exemplary illustrations of the presently disclosed inventive concepts. Additional embodiments, features, functions, and advantages will become apparent from reviewing the disclosures in conjunction with the Figures presented herewith.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing of images (e.g. pictures, figures, graphical schematics, single frames of movies, videos, films, clips, etc.) captured by cameras, especially cameras of mobile devices. As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® it device, etc.

However, as it will become apparent from the descriptions of various functionalities, the presently disclosed mobile image processing algorithms can be applied, sometimes with certain modifications, to images coining from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

General Embodiments

In one embodiment, a method is directed to processing a digital image comprising a digital representation of a document. The method includes: displaying the digital image on a first portion of a display of a mobile device; receiving user feedback via the display of the mobile device, the user feedback designating either a point of interest or a region interest within the displayed image, wherein each of the point of interest and the region of interest respectively comprise only a portion of the digital image; analyzing the user feedback to determine a meaning of the user feedback; based on the determined meaning of the user feedback, analyzing a portion of the digital image corresponding to either the point of interest or the region of interest to detect one or more connected components depicted within the portion of the digital image; classifying each detected connected component depicted within the portion of the digital image; estimating an identity of each detected connected component based on the classification of the detected connected component; and one or more of: displaying the estimated identity of each detected connected component on a second portion of the display of the mobile device; providing the estimated identity of each detected connected component to a workflow.

In another embodiment, a system includes a mobile device comprising hardware and logic. The logic is configured to use the hardware of the mobile device to display the digital image on a first portion of a display of a mobile device; receive user feedback via the display of the mobile device, the user feedback designate either a point of interest or a region interest within the displayed image, wherein each of the point of interest and the region of interest respectively comprise only a portion of the digital image; analyze the user feedback to determine a meaning of the user feedback; based on the determined meaning of the user feedback, analyze a portion of the digital image corresponding to either the point of interest or the region of interest to detect one or more connected components depicted within the portion of the digital image; classify each detected connected component depicted within the portion of the digital image; estimate an identity of each detected connected component based on the classification of the detected connected component; and one or more of: display the estimated identity of each detected connected component on a second portion of the display of the mobile device; provide the estimated identity of each detected connected component to a workflow.

In yet another embodiment, a computer program product includes a computer readable storage medium having stored thereon computer readable program code. The computer readable program code is configured to use hardware of a mobile device to: display the digital image on a first portion of a display of a mobile device; receive user feedback via the display of the mobile device, the user feedback designate either a point of interest or a region interest within the displayed image, wherein each of the point of interest and the region of interest respectively comprise only a portion of the digital image; analyze the user feedback to determine a meaning of the user feedback; based on the determined meaning of the user feedback, analyze a portion of the digital image corresponding to either the point of interest or the region of interest to detect one or more connected components depicted within the portion of the digital image; classify each detected connected component depicted within the portion of the digital image; estimate an identity of each detected connected component based on the classification of the detected connected component; and one or more of: display the estimated identity of each detected connected component on a second portion of the display of the mobile device; provide the estimated identity of each detected connected component to a workflow.

Figure 1:
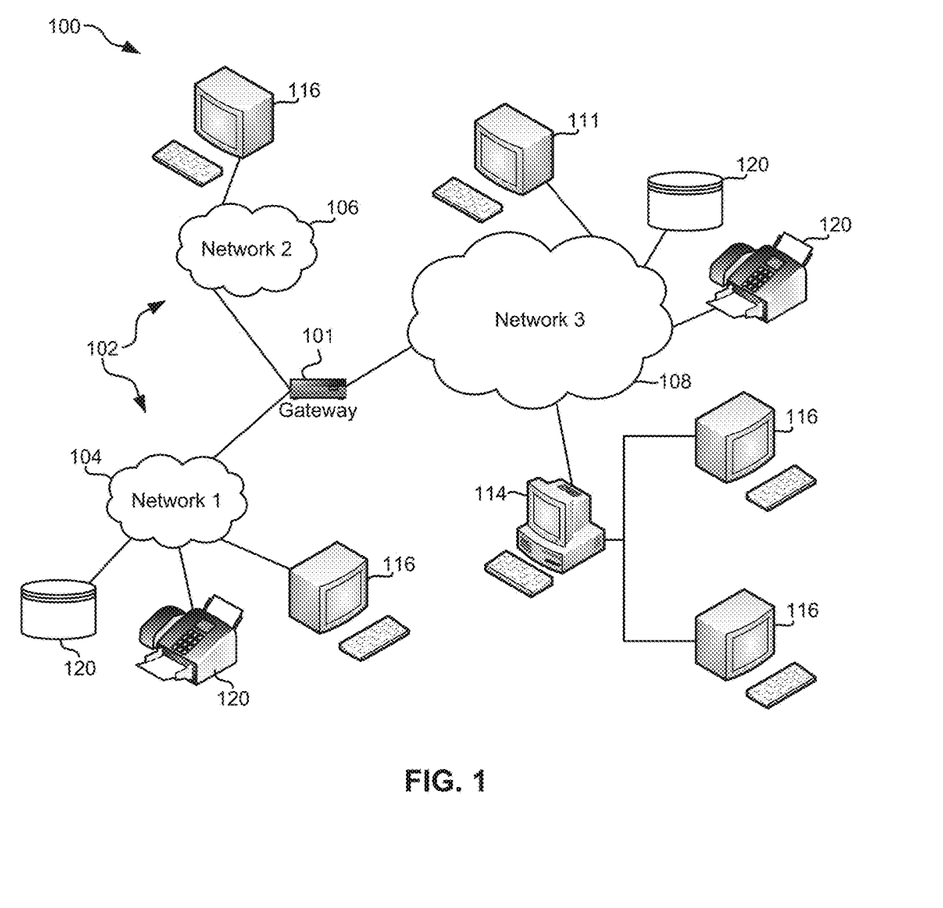
FIG. 1 illustrates a network architecture, in accordance with one embodiment.

Turning now to the figures, FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, mobile device, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According, to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
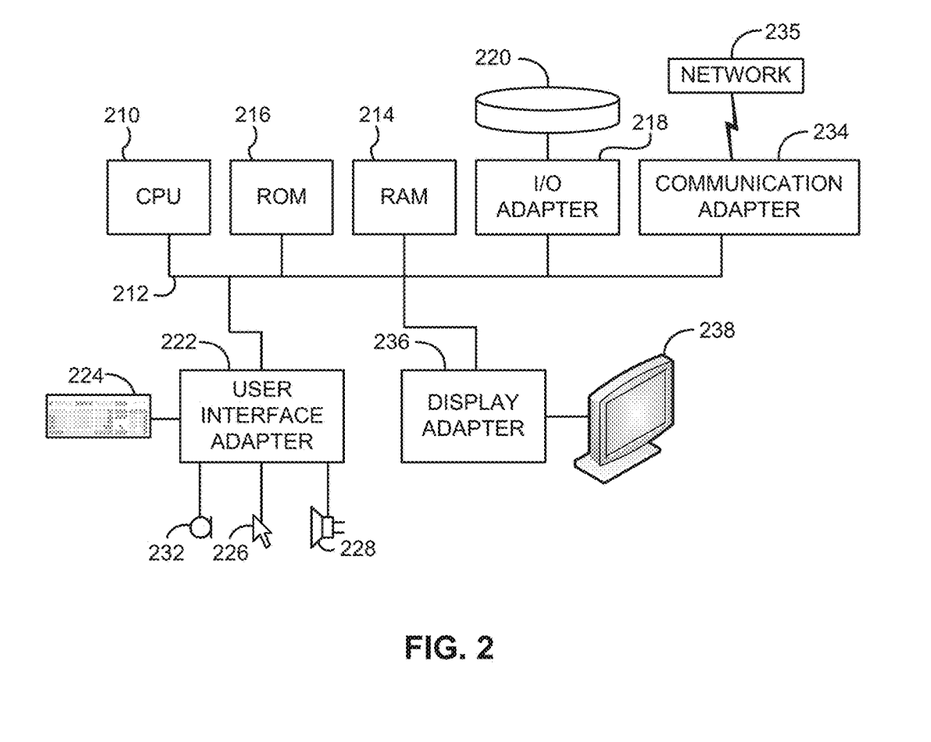
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless(e.g., radio frequency) and optical communication links may be utilized. However, it should be noted that none of the image processing and content recognition techniques discussed herein rely on any resources (e.g. software or hardware) other than those physically present on the mobile device.

The program environment in which one embodiment of the invention may be executed illustratively incorporates one or more general-purpose computers or special-purpose devices such hand-held computers. Details of such devices (e.g., processor, memory, and data storage, input d output devices) are well known and are omitted for the sake of brevity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory FLASH memory and other portable memory cards, etc.), firmware encoded in a chip, etc.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

Various Embodiments of a Mobile Image Capture and Processing Algorithm

Various embodiments of a Mobile Image Capture and Processing algorithm, as well as several mobile applications configured to facilitate use of such algorithmic processing within the scope of the present disclosures are described below. It is to be appreciated that each section below describes functionalities that may be employed in any combination with those disclosed in other sections, including any or up to all the functionalities described herein.

However, it should be understood that the presently disclosed inventive concepts exclude the use of device(s) and/or processing resource(s) not physically located on the mobile device being utilized to perform the disclosed techniques. Indeed, one of the primary advantages of employing the disclosed concepts is the capability to perform content recognition and extraction (e.g. using an OCR engine) in a computationally efficient manner while relying only on resources (software and/or hardware) physically located on the mobile device. As understood herein, and according to various embodiments, "computationally efficient" processing should be considered for instance, corresponding to identifying in under 500 ms using a mobile device of a generation current to the filing of the present application (e.g. iPhone 6, iPhone 6 Plus) with a dual core A8 processor having a clock speed of 1.4 GHz.

As noted in the background, the conventional implementations of image processing on mobile platforms is limited by the processing power of the mobile device, power consumption concerns unique to mobile devices, and often rely on a network connection to overcome these limitations by leveraging more efficient, powerful resources connected to the network but not physically present on the mobile device.

The presently disclosed inventive concepts overcome these limitations and enable implementation of otherwise computationally cost-prohibitive content recognition directly and exclusively using a mobile device. The content recognition techniques described herein are computationally efficient, enabling the mobile device to recognize meaningful information using far fewer resources (including but not limited to memory, processor time, and battery power) and in much less time than required by conventional content recognition, e.g. OCR, techniques.

In general, specific aspects and advantages of which will be understood by reviewing the following disclosures in greater detail, the present inventive concepts overcome the conventional limitations by leveraging user intelligence and user interaction to restrict the amount of data submitted to a content recognition engine to only meaningful information, i.e. information of interest to the user.

An application may be installed on the mobile device, e.g., stored in a nonvolatile memory of the device. The application is provided in the form of a computer program product, and includes computer readable program code configured to execute logic using the mobile device hardware, e.g., processor(s) (CPUs and/or GPUs), memory (volatile and nonvolatile), capacitive resistance display, accelerometer, gyroscope, camera, lamp, etc. as would be understood by one having ordinary skill in the art upon reading the present descriptions.

From the application launch interface, a user may select to either capture an image using the mobile device, load an image from a memory of the device (e.g. from the camera roll, gallery, etc.), or utilize any other suitable technique or mechanism for loading an image into the application (and into memory). Preferably, the image is an image, i.e. a digital representation, of a document depicting content in which the user has interest. For example the document in various embodiments may take the form of a receipt, a letter, a book (cover or interior), a UPC label, an envelope, a bill, a driver license, an invoice, an account statement, etc. as would be understood by one having ordinary skill in the art upon reading the present descriptions. Most preferably, the content includes textual information, such as characters and symbols, but the content may also include any type of image information conveying meaning to a user (e.g. a symbol, logo, registration mark, etc.)

Upon loading, the application pre-processes the image to ensure adequate image quality and proper orientation of the image. In various embodiments, a user may be guided to capture an image according to a desired document orientation to ensure correct document orientation, or the algorithm may automatically detect and correct document orientation as necessary. In further embodiments, the algorithm may correct orientation, and the user may be provided an opportunity to verify or refute the "corrected" orientation, as well as manually define a document orientation. In any case, it is preferred that the document is oriented such that content is "right-side-up."

Upon completion of pre-processing, the image is displayed to the user, and user feedback is solicited (either via instructions provided with the application, via a prompt presented on the mobile device display, or any other suitable manner). The user feedback designates the region of the document depicting content of interest, in one of three primary ways. First, the user may tap singly on the display (with a single finger) to designate, for example, a single word desired for recognition and extraction. As described in further detail below, this initiates a progressive search for content in an area surrounding the location of the single finger single tap. In another approach, the user may singly tap the display with two diagonally splayed fingers, designating content in a region interior to a rectangle with opposite corners defined according to the location of the two taps. In a third embodiment, a user may use a single finger to double tap a portion of the image, and the algorithm defines a rectangular region expanding across all or substantially all of the image (i.e. a "line" of content) in proximity to the location of the double-tap.

Figure 3:
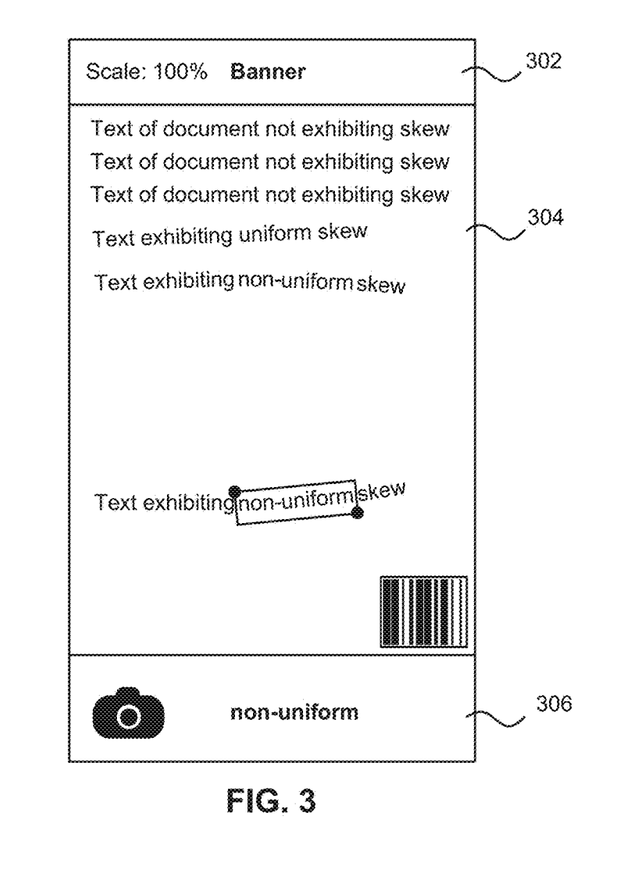
FIG. 3 is a schematic depiction of a result of selective, user-mediated content recognition, according to one embodiment
Figure 4:
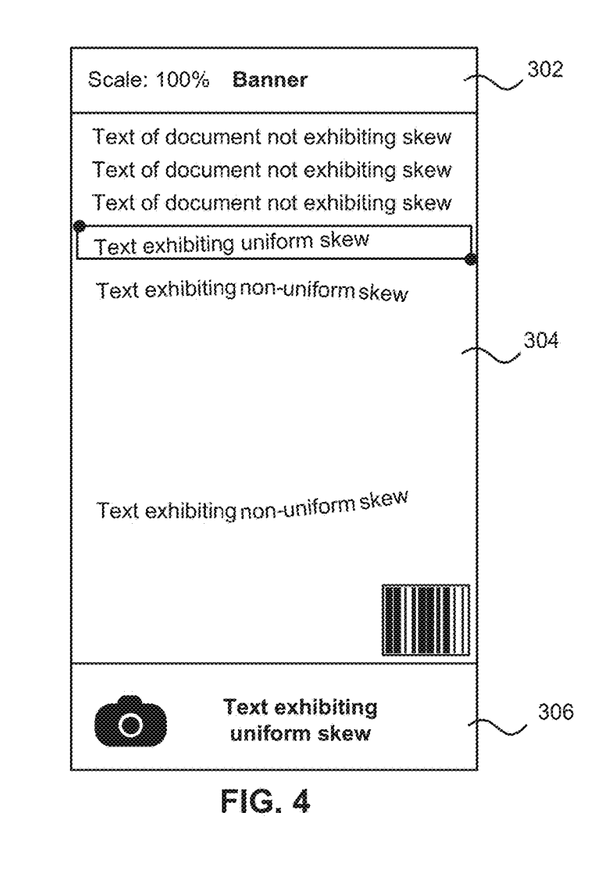
FIG. 4 is a schematic depiction of a result of selective, user-mediated content recognition, according to another embodiment.
Figure 5:
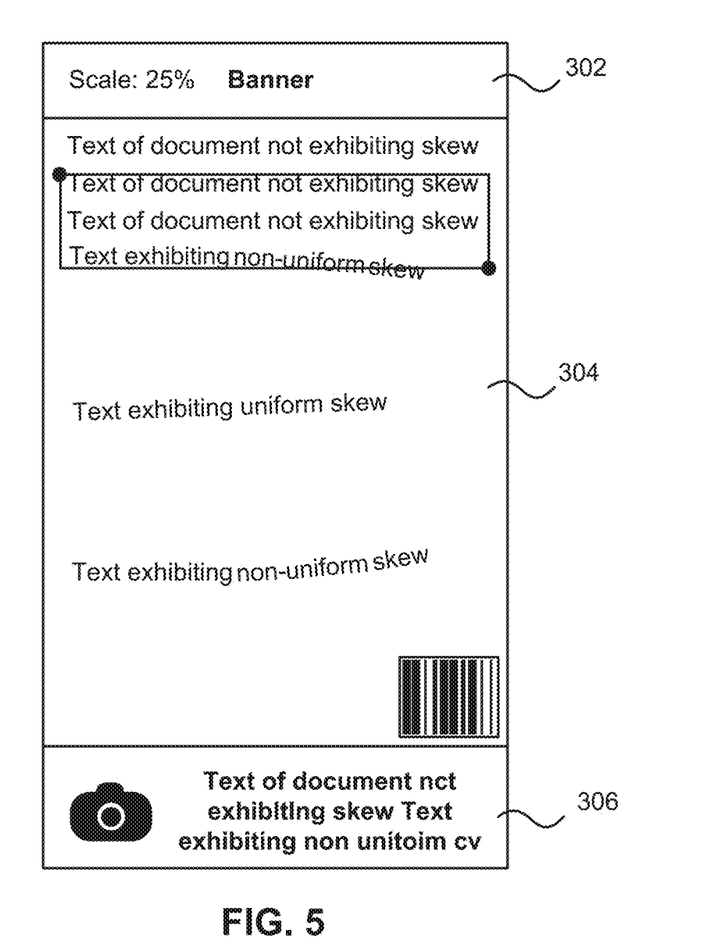
FIG. 5 is a schematic depiction of a result of selective, user-mediated content recognition, according to yet another embodiment.

These three concepts are demonstrated graphically in FIGS. 3-5. FIG. 3 shows the result of a single finger single tap, FIG. 4 the result of a single finger double-tap, and FIG. 5 shows the result of a double finger single tap (with some recognition inaccuracies due to downsampling). Of course, other gestures may be associated with different techniques for user-mediated content recognition as disclosed herein, without departing from the scope of the presently disclosed inventive concepts.

In one embodiment, and as shown in FIGS. 3-5, an interface for user-mediated content recognition includes a banner region 302 displaying information such as a name of the mobile application providing the interface, and a scaling of the image (e.g. a degree of information from the as-captured image which is depicted in the image display region 304. Scaling may be interpreted as a measure of the degree of downsampling to which the image has been subjected, in more approaches.

As shown in FIGS. 3-5, a subregion within the image display region 304 may be designated based in whole or in part on user input (e.g. gesture(s)) for content recognition. For instance, in one approach a single finger single tap may designate a content recognition technique configured to locate and recognize a single contiguous string of connected components, e.g. characters, symbols, etc. having spacing therebetween less than a threshold value.

In another approach a different gesture, e.g. a single finger double tap gesture, may be input to designate a content recognition technique configured to locate and recognize connected components within a region spanning a horizontal extent of the image displayed in image display region 304.

In still more approaches, yet another gesture such as a double finger single tap may be input to designate a content recognition technique configured to locate and recognize connected components within a region spanning a rectangular extent of the image displayed in image display region 304. Preferably, in the case of a double finger single tap the location of the two fingers define opposing vertices of the rectangular extent, In any event, upon completing the content recognition analysis, in various embodiments the result thereof may be displayed on the mobile device, e.g. in the result display region 306, as shown in FIGS. 3-5. Result display region 306 may additionally and optionally include a button or similar interactive element configured to initiate a capture operation using a camera or other optical sensors of the mobile device, in preferred embodiments.

As further demonstrated from FIGS. 3-5, and as mentioned in the background, downsampling is one technique to reduce (in the context of these disclosures further reduce) the cost of content recognition-type image processing on mobile devices. However, the amount of downsampling required to achieve computational efficiency, as defined herein, using conventional approaches is often too significant to permit precise, accurate content recognition. For example, as shown in FIG. 5, at a scaling factor of 25% even the presently disclosed algorithms experience performance degradations. Accordingly, while downsampling can further reduce processing time and memory/power consumption, and should be understood as fully within the scope of the instant disclosures, such approaches are not the preferred solution to content recognition on mobile devices.

Figure 6:
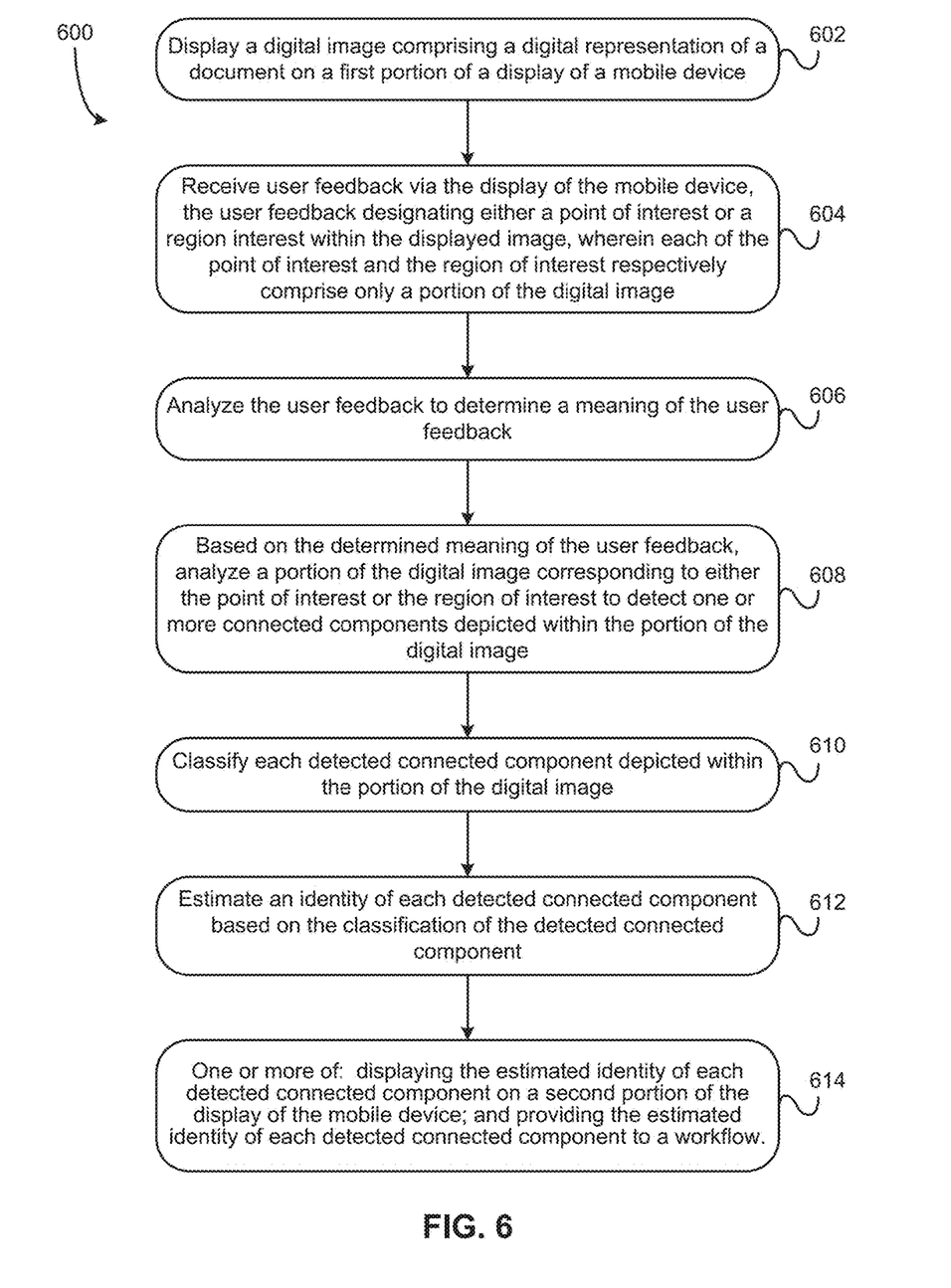
FIG. 6 is a flowchart of a method, according to one embodiment.

Several exemplary embodiments of the generally described concepts presented above are described in further detail, below, with reference to method 600 as shown in FIG. 6. The method 600 may be performed in any suitable environment, including those depicted in FIGS. 1-2, among others, and is preferably performed using a mobile device and resources physically resident on the mobile device rather than resources with which the mobile device may be communicatively coupled, e.g. servers, workstations, etc, as would be understood by a person having ordinary skill in the art upon reading the present descriptions.

In one embodiment, and as shown in FIG. 6, a method 600 for processing a digital image depicting a digital representation of a document generally includes operations 602-614. Though depicted in a sequential order, it should be understood that the operations may be performed in any suitable order that would be appreciated by skilled artisans upon reviewing the instant disclosures.

In operation 602, method 600 includes displaying the digital image on a first portion of a display of a mobile device. The digital image may be displayed substantially as shown in any of FIGS. 3-5, in several approaches, as well as any other suitable portion of the mobile device display. Preferably, the image is displayed in a portion sufficiently large as to permit a user to provide feedback, e.g. using one or more gestures such as taps, tap-and-hold, swipe, pinch, spread/splay, etc. using one or more input points or devices such as fingers, styluses, etc. as would be understood by a person having ordinary skill in the art upon reading the present description.

Method 600 also includes receiving user feedback via the display of the mobile device in operation 604, e.g. using any technique or device as set forth above. The user feedback preferably designates either a point of interest or a region interest within the displayed image, where each of the point of interest and the region of interest respectively comprise only a portion of the digital image.

Method 600 also includes operation 606, which involves analyzing the user feedback to determine a meaning of the user feedback. Determining the meaning of user feedback may include interpreting the user feedback to determine which of a plurality of predefined gestures was input by the user. Based on the input gesture, the image may be analyzed using one or more of the various image analysis techniques described herein, e.g. by defining a region within which to search for connected components (e.g. a shape and area of the region).

Accordingly, in operation 608 the method 600 involves, based on the determined meaning of the user feedback, analyzing a portion of the digital image corresponding to either the point of interest or the region of interest to detect one or more connected components depicted within the portion of the digital image.

In addition, method 600 includes classifying each detected connected component depicted within the portion of the digital image in operation 610.

In operation 612, an identity of each detected connected component is estimated, the estimation being based on the classification of the detected connected component.

Further still, method 600 in operation 614 includes one or more of: displaying the estimated identity of each detected connected component on a second portion of the display of the mobile device; providing the estimated identity of each detected connected component to a workflow.

Of course, the method 600 according to various embodiments may additionally and/or alternatively include any number of different and/or further features, operations, etc. as disclosed herein. Several such exemplary embodiments are described below, and should be understood as merely illustrative examples rather than limitations on the scope of the presently disclosed inventive concepts.

Preferably, the user feedback is provided in the form of a gesture selected from a group consisting of a single-finger tap, a dual-finger tap, and a single-finger double-tap.

Where the user feedback is a single-finger tap, wherein the single-finger tap designates the point of interest, and wherein the portion of the digital image encompasses an unbroken character string in closest proximity to the point of interest. In such embodiments, analyzing the portion of the digital image may optionally include a progressive search for connected components in two or more directions extending away from the point of interest. The two or more directions preferably define a substantially rectangular shape.

In some approaches, the progressive search also includes: defining a small rectangular search window surrounding the point of interest; and searching for connected components within the search window. In response to detecting one or more connected components within the small rectangular, search window, the method includes: determining a location and an orientation of each detected connected component; and defining a large rectangular search window based at least in part on the location and the orientation of each detected connected component, where the large rectangular search window encompasses the small rectangular search window. Alternatively, in response to not detecting any connected components within the small rectangular search window, the method includes extending the progressive search in a spiral fashion, extending outward into a region surrounding the small rectangular search window.

Further still, the progressive search may include: defining a small rectangular search window surrounding the point of interest; detecting a plurality of connected components within the search window (the plurality of connected components being positioned along a substantially straight line); and automatically defining the portion of interest as a region extending across an entirety of the image along a rectangle having a longitudinal axis coincident to the substantially straight line.

Preferably, the progressive search terminates in each respective direction in response to determining the search in that respective direction has extended for a predetermined length without detecting any connected components. For example, in one embodiment the predetermined length corresponds to one or more of: a length greater than a median distance between the detected connected components; a length greater than a mean distance between the detected connected components; a margin spacing corresponding to the document; a tab spacing corresponding to the document; a column width corresponding to the document; and field width corresponding to the document.

In more approaches, the user feedback is the dual-finger tap. The location of each finger during the dual-finger tap corresponds to opposite corners of a rectangle, and the dual-finger tap designates the region of interest. The portion of the image depicting content to be recognized consists of pixels located interior to the rectangle.

In still more approaches, the user feedback is the single-finger double-tap designating the region of interest. The portion of the digital image having content to be recognized is defined as those pixels interior to a rectangle spanning substantially an entire width of the digital image or the entire width of the digital image, and a predetermined vertical portion of the digital image. The rectangle is vertically centered on a location of the image corresponding to the single-finger double-tap. The predetermined vertical portion of the digital image is characterized by a height in a range from about 50 pixels to about 150 pixels.

In various embodiments, detecting the one or more connected components comprises detecting a presence and a location of each connected component depicted within the region of interest. Preferably, the classifying and the estimating are based at least in part on an optical character recognition technique.

Preferably, all operations of the method are performed utilizing only resources physically resident on the mobile device.

As noted above, the present techniques also significantly reduce the amount of resources required to process image data, both in terms of processor time and memory. In several embodiments, this may be accomplished by processing only a portion of the digital image rather than the entire digital image. Accordingly, it is advantageous in such circumstances to store a portion of the image data corresponding to the region of interest to the user in a separate memory location than the originally loaded image, and only process that separately stored image data. In various approaches, therefore, the method may further include storing image data corresponding to the portion of the digital image in a second memory location, and analyzing the portion of the digital image using the portion of the digital image stored in the second memory location.

The connected components preferably include textual information selected from alphanumeric characters and symbols. The characters may represent prose, numeric data, and in preferred embodiments may represent financial information such as typically depicted on an invoice, receipt, bill, check, bank statement, etc. as would be understood by one having ordinary skill in the art upon reading the present descriptions. In some approaches the connected components may additionally and/or alternatively image information selected from a barcode, a stamp, a logo, a photograph, an icon, a hologram, a registration mark, and a watermark.

Of course, the method may optionally include capturing the digital image using the mobile device, or may be performed using a previously captured image stored in memory.

In more embodiments, the method may include downsampling the digital image to generate a second digital image having a reduced resolution, wherein the analyzing to detect one or more connected components and the classifying detected connected components are performed using the second digital image instead of the digital image.

In one approach, techniques for finding a line of information may proceed as follows. First, a single point is determined, e.g. from a user gesture as discussed above. A line is defined expanding in two directions outwards from the point as in the process of finding a single word. Once the initial rectangle is defined, on both ends of the rectangle the search is expanded. This can be done either character by character or in an attempt to detect and recognize larger portions of data, e.g. a field of a table, or a line of a document.

For instance, suppose the initial search yielded a rectangle that contains three characters positioned on a line. The rectangle can be expanded in small pieces to the left and right, for instance by a predetermined number of pixels, by the mean or median width of two characters, etc., with the goal of finding one additional character on either side. The line direction and/or orientation may be updated based on the additional character(s) found, and another iteration of the above character search may be performed. This process may be repeated until no further adjacent characters are found in either direction.

In alternative embodiments, the rectangle may be expanded by a distance greater than a mean or median width of two characters, for example in order to detect strings of words in a line rather than a single word. In such instances, it is possible to detect lines of words by expanding the rectangle by a predetermined distance, e.g. a predetermined number of pixels (10, 15, or 20 pixels in various embodiments). In particularly preferred embodiments, the predetermined distance is based on a priori knowledge about the type of document being processed, e.g. based on a known word spacing, font type and/or font size, a known document margin; a known field, column or cell width as would be particularly useful for processing form documents or tables; a distance corresponding to a tab spacing e.g. approximately 0.5 inches, or a corresponding number of pixels at a particular resolution such as 8-12 MP), etc. as would be understood by one having ordinary skill in the art upon reading the present descriptions.

Alternatively, a line can be assumed based on the three characters yielded in the rectangle, and projected to the left and right boundaries of the image based on, e.g., the baseline of the detected characters, the lower side of the rectangle, etc. Similarly, the height of the line can be estimated by the found characters. A rectangle would thus be created that covers the whole line of the document, such that the original characters are inside the rectangle.

In additional embodiments, the rectangle may be expanded vertically in one or both directions by a predetermined or calculated amount to account for skew and smaller distortions. For example, the rectangle may be expanded by a predetermined number of pixels (e.g. 10, 15 or 25 pixels in various embodiments), may be expanded based on calculated character height (e.g. by a number of pixels approximately equal to half of the mean or median height of the three or more characters in the rectangle).

One additional advantage of processing only a small portion of the overall image addresses the problem noted above in paragraph [0014]. Images captured with a mobile device frequently show non-linear distortion effects, which are conventionally addressed by attempting to rectangularize the document depicted in an image based on the detected position and orientation of document edges. One problem with this approach is that the edges curve one way, but the content may curve another way. Thus, conventional edge and/or page detection techniques that seek to correct projective effects based on detected edges and rectangularize the image tend to introduce additional artifacts of distortion within the image when the direction of curvature of one or more edges differs from the direction of curvature of content depicted within the image.

By focusing on a particular area within the image, e.g. a region of interest that encompasses only a single word, a few words, a single line, a single field or cell, etc., the presently disclosed inventive concepts solve the aforementioned problem, e.g. by using dynamic deskewing with a focus on only the region of interest. In addition or alternatively, some embodiments solve the aforementioned problem by allowing for a slight shift in skew angle between adjacent connected components e.g. ±5 degrees from character to character) rather than trying to fit the detected connected components to a linear orientation as is typically required by optical character recognition techniques.

Accordingly, the presently disclosed inventive concepts represent an improvement to the functioning of computers, and particularly mobile devices, because the inventive concepts presented herein facilitate more accurate content recognition by enabling recognition techniques to utilize high-density image data (i.e. without downsampling). More particularly, by implementing a zone-based recognition process, the presently disclosed inventive concepts are characterized by reducing the amount of computational resources (e.g. memory, processor utilization) necessary to recognize content within digital images.

In multiple embodiments, a method, system, and/or computer program product within the scope of the present disclosures may be characterized by all of the preceding features and/or include performing all of the preceding operations.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may he implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for processing a digital image comprising a digital representation of a document, the method comprising:
    displaying the digital image on a first portion of a display of a mobile device;
    receiving user feedback via the display of the mobile device, the user feedback designating either a point of interest or a region interest within the displayed image, wherein each of the point of interest and the region of interest respectively comprise only a portion of the digital image;
    analyzing the user feedback to determine a meaning of the user feedback;
    based on the determined meaning of the user feedback, analyzing a portion of the digital image corresponding to either the point of interest or the region of interest to detect one or more connected components depicted within the portion of the digital image;
    classifying each detected connected component depicted within the portion of the digital image;
    estimating an identity of each detected connected component based on the classification of the detected connected component; and
    one or more of:
        displaying the estimated identity of each detected connected component on a second portion of the display of the mobile device; and
        providing the estimated identity of each detected connected component to a workflow;
    wherein the user feedback comprises a single-finger tap, wherein the single-finger tap designates the point of interest, and wherein the portion of the digital image encompasses an unbroken character string in closest proximity to the point of interest;
    wherein analyzing the portion of the digital image further comprises a progressive search for connected components in two or more directions extending away from the point of interest; and
    wherein the progressive search further comprises:
        defining a small rectangular search window surrounding the point of interest;
        searching for connected components within the search window;
        in response to detecting one or more connected components within the small rectangular search window:
        determining a location and an orientation of each detected connected component; and
        defining a large rectangular search window based at least in part on the location and the orientation of each detected connected component, wherein the large rectangular search window encompasses the small rectangular search window; and
        in response to not detecting any connected components within the small rectangular search window, extending the progressive search in a spiral surrounding the small rectangular search window.

2. The method as recited in claim 1, wherein the two or more directions define a substantially rectangular shape.

3. The method as recited in claim 1, wherein the progressive search terminates in each respective direction in response to determining the search in that respective direction has extended for a predetermined length without detecting any connected components.

4. The method as recited in claim 3, wherein the predetermined length corresponds to one or more of:
    a length greater than a median distance between the detected connected components;
    a length greater than a mean distance between the detected connected components;
    a margin spacing corresponding to the document;
    a tab spacing corresponding to the document;
    a column width corresponding to the document; and
    a field width corresponding to the document.

5. The method as recited in claim 1, wherein the user feedback further comprises a dual-finger tap, wherein a location of each finger during the dual-finger tap corresponds to opposite corners of a rectangle, wherein the dual-finger tap designates the region of interest, and wherein the portion of the digital image consists of pixels located interior to the rectangle.

6. The method as recited in claim 1, wherein the user feedback further comprises a single-finger double-tap, wherein the single-finger double-tap designates the region of interest, wherein the portion of the digital image corresponds to an interior of a rectangle spanning an entire width of the digital image and a predetermined vertical portion of the digital image, and wherein the rectangle is vertically centered on a location of the digital image corresponding to the single-finger double-tap.

7. The method as recited in claim 6, wherein the predetermined vertical portion of the digital image is characterized by a height in a range from 50 pixels to 150 pixels.

8. The method as recited in claim 1, wherein detecting the one or more connected components comprises detecting a presence and a location of each connected component depicted within the region of interest.

9. The method as recited in claim 1, wherein all operations of the method are performed utilizing only resources physically resident on the mobile device, and wherein the resources comprise hardware components and software components.

10. The method as recited in claim 1, wherein the classifying and the estimating are based at least in part on an optical character recognition technique.

11. The method as recited in claim 1, further comprising storing image data corresponding to the portion of the digital image in a second memory location, and wherein the analyzing the portion of the digital image is performed using the portion of the digital image stored in the second memory location.

12. The method as recited in claim 1, wherein the connected components comprise textual information selected from alphanumeric characters and symbols.

13. The method as recited in claim 1, wherein the connected components comprise image information selected from a barcode, a stamp, a logo, a photograph, an icon, a hologram, a registration mark, and a watermark.

14. The method as recited in claim 1, further comprising downsampling the digital image to generate a second digital image having a reduced resolution, wherein the analyzing to detect one or more connected components and the classifying detected connected components is performed using the second digital image instead of the digital image.

15. A computer program product comprising a non-transitory computer readable medium having program instructions embodied therewith, the program instructions being configured to cause a processor of a mobile device to perform a method for processing a digital image comprising a digital representation of a document, the method comprising:

displaying the digital image on a first portion of a display of a mobile device;

receiving user feedback via the display of the mobile device, the user feedback designating either a point of interest or a region interest within the displayed image, wherein each of the point of interest and the region of interest respectively comprise only a portion of the digital image;

analyzing the user feedback to determine a meaning of the user feedback;

based on the determined meaning of the user feedback, analyzing a portion of the digital image corresponding to either the point of interest or the region of interest to detect one or more connected components depicted within the portion of the digital image;

classifying each detected connected component depicted within the portion of the digital image;

estimating an identity of each detected connected component based on the classification of the detected connected component; and  one or more of:

displaying the estimated identity of each detected connected component on a second portion of the display of the mobile device; and  providing the estimated identity of each detected connected component to a workflow;

wherein the user feedback comprises a single-finger tap, wherein the single-finger tap designates the point of interest, and wherein the portion of the digital image encompasses an unbroken character string in closest proximity to the point of interest;

wherein analyzing the portion of the digital image further comprises a progressive search for connected components in two or more directions extending away from the point of interest; and  wherein the progressive search further comprises:

defining a small rectangular search window surrounding the point of interest;

searching for connected components within the search window;

in response to detecting one or more connected components within the small rectangular search window:

determining a location and an orientation of each detected connected component; and   defining a large rectangular search window based at least in part on the location and the orientation of each detected connected component, wherein the large rectangular search window encompasses the small rectangular search window; and   in response to not detecting any connected components within the small rectangular search window, extending the progressive search in a spiral surrounding the small rectangular search window.

\* \* \* \* \*

UNITED STATES PATENT AND TRADEMARK OFFICE
CERTIFICATE OF CORRECTION

PATENT NO. : 10,049,268 B2  
APPLICATION NO. : 15/059242  
DATED : August 14, 2018  
INVENTOR(S) : Anthony Macciola et al.

Page 1 of 1

It is certified that error appears in the above-identified patent and that said Letters Patent is hereby corrected as shown below:

In the Specification

Column 1, Line 63 please replace "battery power to b useful" with --battery power to be useful--;

Column 5, Line 44 please replace "to images coining from scanners" with --to images coming from scanners--;

Column 8, Line 64 please replace "storage, input d output" with --storage, input and output--;

Column 9, Line 28 please replace "semiconductor memory FLASH memory" with --semiconductor memory (e.g., FLASH memory--;

Column 10, Line 8 please replace "readable instructions be written" with --readable instructions can be written--;

Column 14, Line 56 please replace "document; and field" with --document; and a field--;

Column 17, Line 24 please replace "and may he implemented" with --and may be implemented--.

Signed and Sealed this  
Twenty-first Day of April, 2020

Andrei Iancu  
*Director of the United States Patent and Trademark Office*